United States Patent
Mou (10) Patent No.: US 12,555,246 B2
(45) Date of Patent: Feb. 17, 2026

(54) METHOD AND SYSTEM FOR DETECTING MOVING OBJECT

(71) Applicant: OmniVision Sensor Solution (Shanghai) Co., Ltd, Shanghai (CN)

(72) Inventor: Xiaozheng Mou, Shanghai (CN)

(73) Assignee: OmniVision Sensor Solution (Shanghai) Co., Ltd, Shanghai (CN)

( * ) Notice: Subject to any disclaimer, the term of this patent is extended or adjusted under 35 U.S.C. 154(b) by 319 days.

(21) Appl. No.: 18/226,818

(22) Filed: Jul. 27, 2023

(65) Prior Publication Data
US 2023/0368397 A1 Nov. 16, 2023

Related U.S. Application Data

(63) Continuation of application No. PCT/CN2021/075434, filed on Feb. 5, 2021.

(30) Foreign Application Priority Data

Feb. 2, 2021 (CN) .......................... 202110145826.7

(51) Int. Cl.
*G06T 7/215* (2017.01)
*G06F 18/214* (2023.01)
(Continued)

(52) U.S. Cl.
CPC ...... *G06T 7/20* (2013.01); *G06T 2207/20021* (2013.01)

(58) Field of Classification Search
CPC . G06T 7/20; G06T 2207/20021; G06T 7/215; G06V 40/20; G06F 18/214; G06F 18/2411
See application file for complete search history.

(56) References Cited

U.S. PATENT DOCUMENTS

2013/0322766 A1 12/2013 Alpert et al.

FOREIGN PATENT DOCUMENTS

| CN | 108765454 A | 11/2018 |
| CN | 109409288 A | 3/2019 |

(Continued)

OTHER PUBLICATIONS

Afshar S, Hamilton TJ, Tapson J, van Schaik A and Cohen G (2019) Investigation of Event-Based Surfaces for High-Speed Detection, Unsupervised Feature Extraction, and Object Recognition. Front. Neurosci. 12:1047. doi: 10.3389/fnins.2018.01047 (Year: 2018).*

*Primary Examiner* — Andrew M Moyer
*Assistant Examiner* — Dylan John Mendez Muniz
(74) *Attorney, Agent, or Firm* — IPRO, PLLC; Na Xu (57) ABSTRACT

The present disclosure provides a method and a system for detecting a moving object, and a computing device. The method includes: dividing a predetermined image template into a plurality of image blocks having a same size; determining the quantity of pieces of event data in each image block within a predetermined time period, the event data being obtained by a dynamic vision sensor and triggered by movement of an object in a field of view relative to the dynamic vision sensor; determining at least one image block including the moving object in accordance with the quantity of pieces of event data in each image block; and generating a candidate object rectangle in accordance with the at least one image block, the candidate object rectangle indicating the detected moving object.

12 Claims, 6 Drawing Sheets

(51) Int. Cl.
*G06F 18/2411* (2023.01)
*G06T 7/20* (2017.01)
*G06V 40/20* (2022.01)

(56) References Cited

FOREIGN PATENT DOCUMENTS

| | | |
|---|---|---|
| CN | 109716392 A | 5/2019 |
| CN | 111462155 A | 7/2020 |
| JP | 2016045088 A  * | 4/2016 |

* cited by examiner

METHOD AND SYSTEM FOR DETECTING MOVING OBJECT

TECHNICAL FIELD

The present disclosure relates to the field of data processing technology, in particular to a method and a system for detecting a moving object.

BACKGROUND

In conventional image sensor-based object detection methods, it is necessary to traverse an entire image. The detection methods include a conventional machine-learning algorithm, e.g., Adaboost or Random Forest, and a deep-learning algorithm which is currently studied extensively, e.g., YOLO, Faster RCNN or SSD. Usually, a target object occupies a small region in the image, and a large computational burden occurs for a region other than the target object, so there is a very big challenge for the real-time performance of the algorithm. In addition, when the object moves too fast, a motion blur occurs in the image, so a feature of the moving object in the image is not obvious or changes, and thereby the conventional object detection and identification algorithm fails.

Hence, there is an urgent need to provide a new scheme for detecting the moving object.

SUMMARY

An object of the present disclosure is to provide a method and a system for detecting a moving object, so as to solve or at least alleviate at least one of the above-mentioned problems.

In one aspect, the present disclosure provides in some embodiments a method for detecting a moving object, including: dividing a predetermined image template into a plurality of image blocks having a same size; determining the quantity of pieces of event data in each image block within a predetermined time period, the event data being obtained by a dynamic vision sensor and triggered by movement of an object in a field of view relative to the dynamic vision sensor; determining at least one image block including the moving object in accordance with the quantity of pieces of event data in each image block; and generating a candidate object rectangle in accordance with the at least one image block, the candidate object rectangle indicating the detected moving object.

In a possible embodiment of the present disclosure, the method further includes mapping the event data within the predetermined time period to the predetermined image template to generate a time plane image corresponding to the predetermined time period, and the event data includes a coordinate position and a timestamp of a triggered event.

In a possible embodiment of the present disclosure, subsequent to generating the candidate object rectangle in accordance with the at least one image block, the method further includes identifying a type of the moving object indicated through the candidate object rectangle in the time plane image using an image classification algorithm.

In a possible embodiment of the present disclosure, the quantity of pieces of event data in each image block is calculated through $$H(b_{ij}) = \sum_{k=1}^{N} \delta\left(\left[\frac{x_k}{n}\right] + \left[\frac{y_k}{m}\right] + 2 - i - j\right),$$

where $b_{ij}$ represents an image block in an $i^{th}$ row and a $j^{th}$ column, i=1, 2, ..., m, j=1, 2, ..., n, $H(b_{ij})$ represents the quantity of pieces of event data in $b_{ij}$ within the predetermined time period, $(x_k, y_k)$ represents a coordinate position of a $k^{th}$ piece of event data, N represents the total quantity of pieces of event data received within the predetermined time period, $\delta(\cdot)$ represents a Dirac $\delta$ function, and $[\cdot]$ represents a rounding function.

In a possible embodiment of the present disclosure, the determining the at least one image block including the moving object in accordance with the quantity of pieces of event data in each image block includes selecting an image block in which the quantity of pieces of event data is greater than a first predetermined value as the image block including the moving object.

In a possible embodiment of the present disclosure, the generating the candidate object rectangle in accordance with the at least one image block includes: determining a plurality of consecutive image blocks having a common edge in the at least one image block; and generating at least one minimum bounding rectangle as the candidate object rectangle in accordance with the consecutive image blocks.

In a possible embodiment of the present disclosure, the generating the candidate object rectangle in accordance with the at least one image block further includes: calculating overlap rates of the candidate object rectangles detected within a current predetermined time period and a previous predetermined time period; and selecting a candidate object rectangle whose overlap rate is greater than a second predetermined value as a candidate object rectangle within the current predetermined time period.

In a possible embodiment of the present disclosure, prior to dividing the predetermined image template into the plurality of image blocks having a same size, the method further includes generating the predetermined image template in accordance with a pixel unit array in the dynamic vision sensor.

In a possible embodiment of the present disclosure, the mapping the event data within the predetermined time period to the predetermined image template to generate the time plane image corresponding to the predetermined time period includes: for each pixel in the predetermined image template, determining whether there is a triggered event which has a same coordinate position as the pixel; and performing binarization on a pixel value of the pixel in accordance with a determination result so as to generate the time plane image.

In a possible embodiment of the present disclosure, the mapping the event data within the predetermined time period to the predetermined image template to generate the time plane image corresponding to the predetermined time period includes: for each pixel in the predetermined image template, calculating a relational value of a coordinate position of the pixel relative to the coordinate position of each triggered event; and updating a pixel value of the pixel in accordance with the relational value so as to generate the time plane image.

In a possible embodiment of the present disclosure, the first predetermined value is positively correlated with the size of the image block and the predetermined time period.

In another aspect, the present disclosure provides in some embodiments a computing device, including one or more processor, a memory, and one or more programs stored in the memory. The one or more programs is executed by the one or more processors so as to implement the above-mentioned method.

In yet another aspect, the present disclosure provides in some embodiments a computer-readable storage medium storing therein one or more programs. The one or more programs is executed by a computing device so as to implement the above-mentioned method.

In still yet another aspect, the present disclosure provides in some embodiments a system for detecting a moving object, including the above-mentioned computing device, and a dynamic vision sensor coupled to the computing device and configured to trigger an event in accordance with movement of the object in a field of view relative to the dynamic vision sensor and output an event data flow to the computing device.

According to the embodiments of the present disclosure, the predetermined image template is divided into the image blocks having a same block, and the quantity of pieces of event data in each image block is determined. In this way, it is able to rapidly determine all possible regions where the moving object is located without traversing the entire image, thereby to reduce the computational burden. In addition, the quantity of pieces of event data is determined on an image block basis rather than on a pixel-by-pixel basis, so it is able to remarkably reduce the computational burden and improve the positioning robustness.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Recently, a Dynamic Vision Sensor (DVS) has attracted more and more attentions in the field of computer vision technology. The DVS is a biologically-mimic vision sensor for simulating a pulse-triggered neuron-based human retina, and it is provided with an array consisting of a plurality of pixel units. Each pixel unit may respond to and record an area where a light intensity changes rapidly merely when a light intensity change has been sensed. In other words, each pixel unit in the DVS independently responds to and records the area where the light intensity changes rapidly. An event-triggered processing mechanism is adopted by the DVS, so it may output an asynchronous event data flow. The event data flow may be, for example, light intensity change information (e.g., a timestamp of the light intensity change and a light intensity threshold) and a coordinate position of a triggered pixel unit.

Based on the above-mentioned operating principle, it is found that, as compared with a conventional vision sensor, the DVS has the following advantages. 1) The DVS is capable of detecting a high-speed object moving at a speed of up to ten thousand frames per second, without any restraint from an exposure time and a frame rate. 2) The DVS has a larger dynamic range, and it is capable of accurately sensing and output a scenario change even in a low-light or highly-exposed environment. 3) The DVS has lower power consumption. 4) Each pixel unit in the DVS responds to the light intensity change independently, so the DVS is not affected by motion blur.

An object of the present disclosure is to provide a DVS-based scheme for detecting a moving object. Considering defects in an existing moving object detection scheme, the DVS is adopted due to such characteristics as low data redundancy, rapid response and being not affected by motion blur, and an event data flow from the DVS is processed through an algorithm so as to rapidly detect and identify the moving object, thereby to reduce the computational burden and the power consumption, and increase the accuracy and the response speed.

Figure 1:
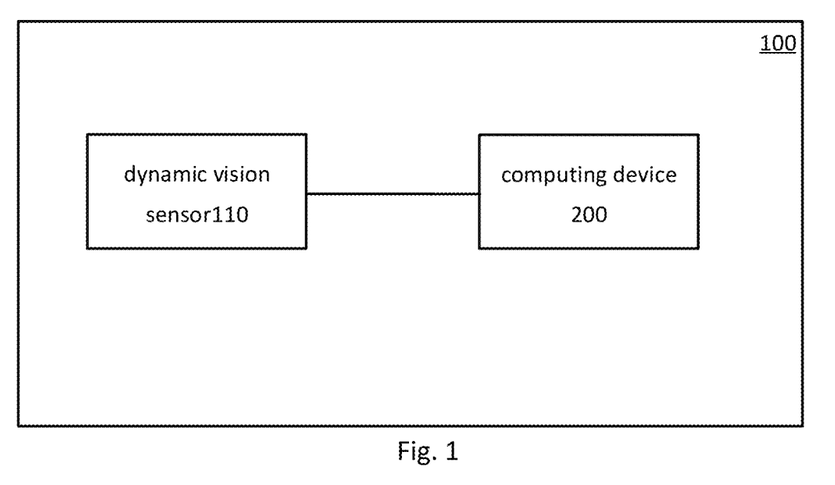
FIG. 1 is a schematic view showing a system for detecting a moving object according to one embodiment of the present disclosure.

FIG. 1 shows a system 100 for detecting a moving object according to one embodiment of the present disclosure. As shown in FIG. 1, the system 100 includes a DVS 110 and a computing device 200 coupled to each other. It should be appreciated that, FIG. 1 is for illustrative purposes only, and the quantity of DVSs and computing devices in the system 100 will not be particularly defined herein.

The DVS 110 monitors in real time a change in movement of an object in a field of view. Once the object moves in the field of view relative to the DVS 110 (i.e., light in the field of view changes), a pixel event (also called as event for short) is triggered, and then the DVS outputs event data about a dynamic pixel (i.e., a pixel unit whose brightness changes). Several pieces of event data outputted within a certain time period form an event data flow. Each piece of event data in the event data flow at least includes a coordinate position of the triggered event (i.e., the pixel unit whose brightness changes) and timestamp information about a time when the event is triggered. A specific structure of the DVS 110 will not be particularly defined herein.

The computing device 200 receives the event data flows from the DVS 110, and processes the event data flows so as to detect the moving object. The computing device 200 further identifies a type of the moving object (e.g., person, vehicle, cat or football). Then, the system 100 performs the subsequent processing, e.g., tracking the moving object, in accordance with a detection result.

Figure 2:
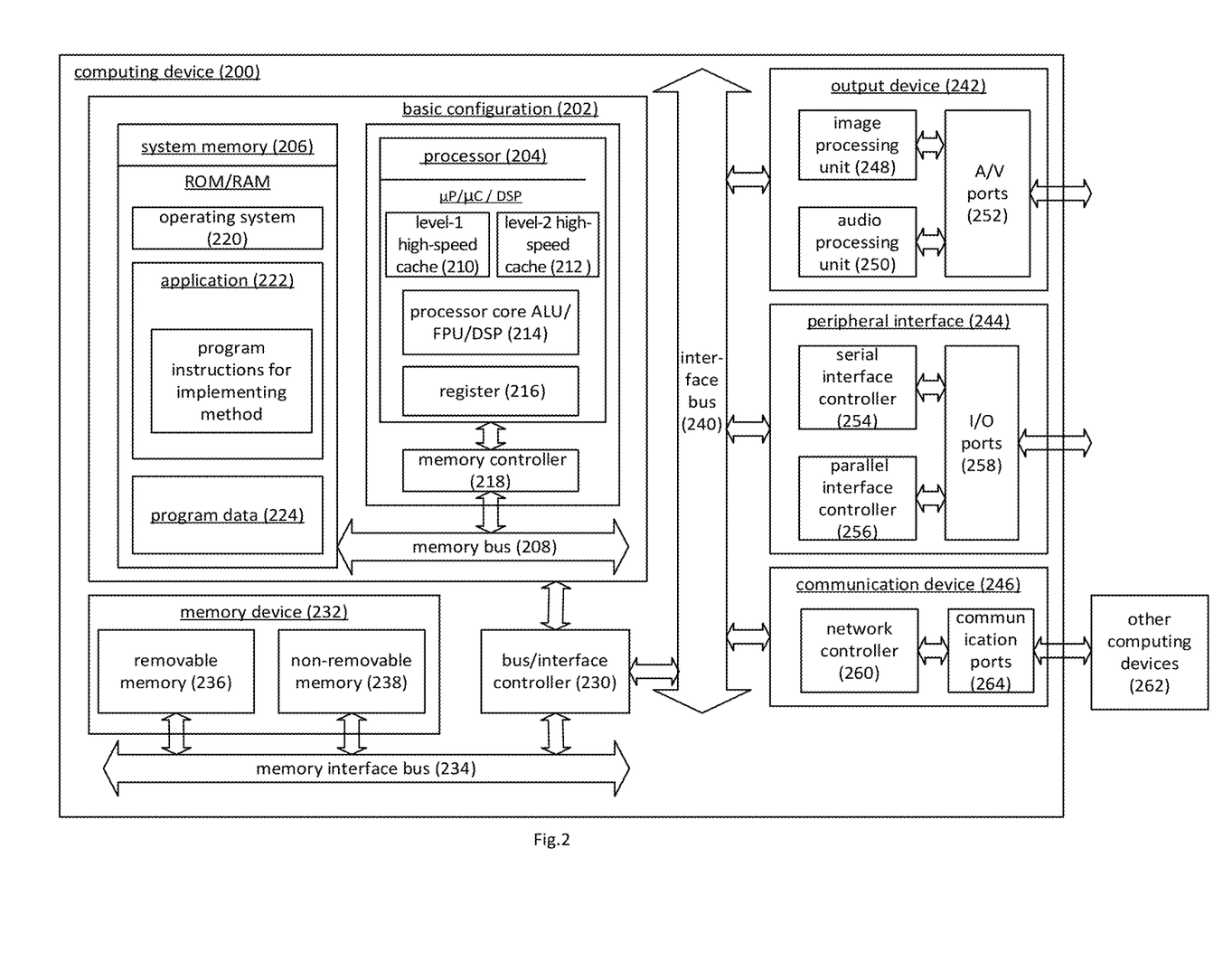
FIG. 2 is a schematic view showing a computing device according to one embodiment of the present disclosure.

FIG. 2 shows the computing device 200. As shown in FIG. 2, in a basic configuration 202, the computing device 200 typically includes a system memory 206 and one or more processors 204. The one or more processors 204 communicates with the system memory 206 via a memory bus 208.

Depending on a desired configuration, the processor 204 may be of any type, and it may include, but not limited to, microprocessor (µP), microcontroller (µC), Digital Signal Processor (DSP), or a combination thereof. The processor 204 may include one or more levels of high-speed caches (e.g., a level-1 high-speed cache 210 and a level-2 high-speed cache 212), a processor core 214 and a register 216. The processor core 214 may include an Arithmetic Logical Unit (ALU), a Float Point Unit (FPU), a DSP core, or a combination thereof. A memory controller 218 may be used together with the processor 204, or in some embodiments of the present disclosure, the memory controller 218 may be an internal component of the processor 204.

Depending on a desired configuration, the system memory 206 may be of any type, and it may include, but not limited to, volatile memory (e.g., Random Access Memory (RAM)), non-volatile memory (e.g., Read Only Memory (ROM) or flash memory), or a combination thereof. The system memory 206 may include an operating system 220, one or more applications 222, and program data 224. In some embodiments of the present disclosure, the application 222 may be operated using the program data 224 on the operating system.

The computing device 200 further includes a storage device 232, which includes a removable memory 236 and an unremovable memory 238 coupled to each other via a memory interface bus 234.

The computing device 200 may further include an interface bus 240 for the communication between various interface devices (e.g., an output device 242, a peripheral interface 244 and a communication device 246) and the basic configuration 102 via a bus/interface controller 230. The output device 242 may include a graphical processing unit 248 and an audio processing unit 250, which are configured to facilitate the communication with various external devices, e.g., display and loudspeaker, via one or more A/V ports 152. The peripheral interface 244 may include a serial interface controller 254 and a parallel interface controller 256, which are configured to facilitate the communication with the external devices, such as input devices (e.g., keyboard, mouse, stylus, voice input device and touch device) or the other devices (e.g., printer or scanner) via one or more I/O ports 258. The communication device 246 may include a network controller 260, which is configured to communicate with one or more other computing devices 262 using a network communication link via one or more communication ports 264.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

Usually, the computing device 200 may be a part of a small-size portable (or mobile) electronic device, e.g., cellular phone, digital camera, PDA, Personal Media Player, wireless network browser, head-mounted device, application-specific device, or a device including the above functions. In a possible embodiment of the present disclosure, the computing device may be a micro computing module, which will not be particularly defined herein.

In the embodiments of the present disclosure, the computing device 200 is configured to implement a method for detecting a moving object. The application 222 in the computing device 200 includes a plurality of program instructions for implementing the method 300 or 500.

It should be appreciated that, in the case that the DVS 100 has sufficient memory space and computing power, the computing device 200 may also be a part of the DVS 110 for processing the event data flow and detecting the moving object.

Figure 3:
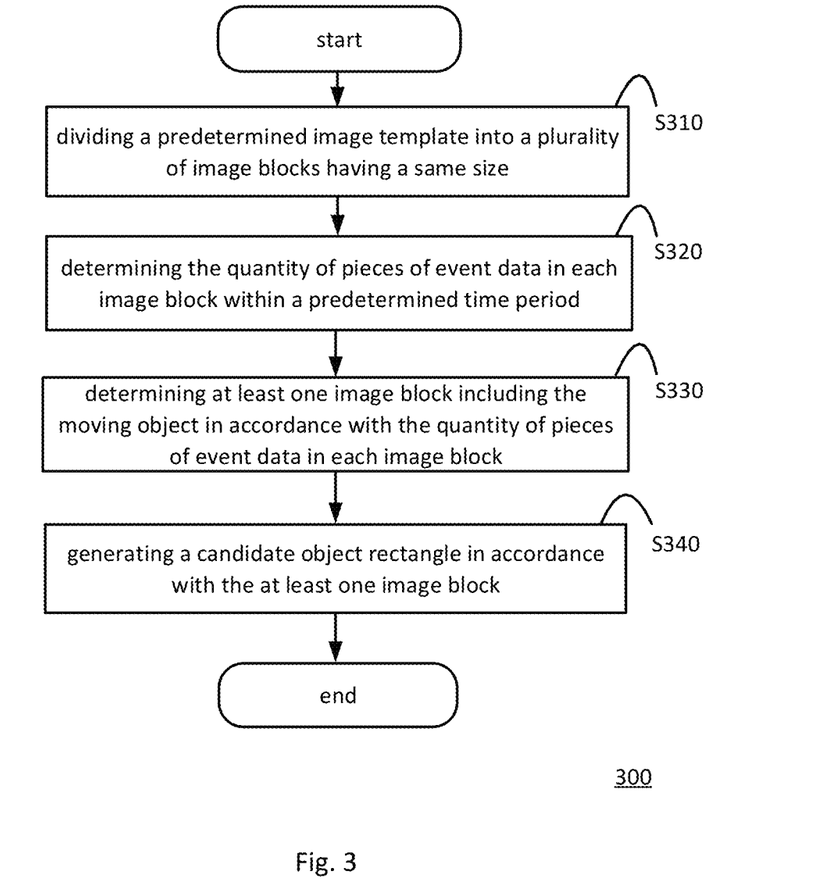
FIG. 3 is a flow chart of a method for detecting a moving object according to one embodiment of the present disclosure.

FIG. 3 is a flow chart of a method 300 for detecting a moving object, and the method 300 is executed by the computing device 200. It should be appreciated that, the implementation of the method 300 may refer to that of the system 100, which will not be particularly defined herein.

As shown in FIG. 3, the method 300 includes the following steps.

Step S310: dividing a predetermined image template into a plurality of image blocks having a same size.

Figure 4A:
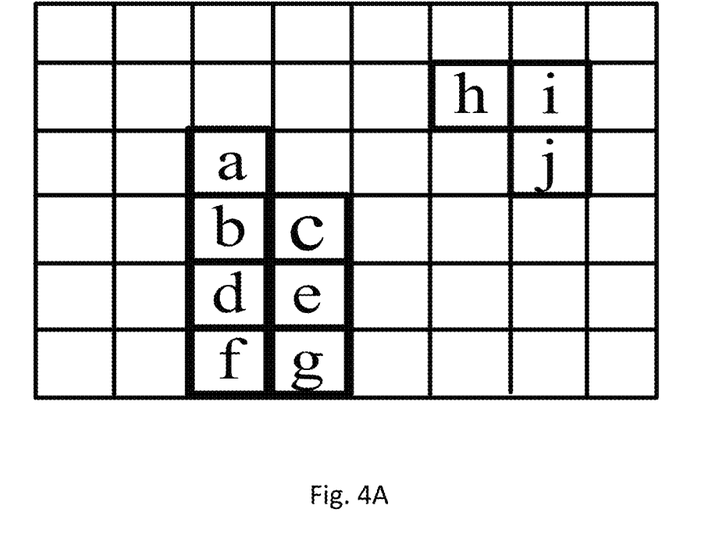
FIGS. 4A and 4B are schematic views showing the determination of a candidate object rectangle according to one embodiment of the present disclosure.

In the embodiments of the present disclosure, the method 300 further includes generating the predetermined image template. To be specific, the predetermined image template is generated in accordance with a pixel unit array in a DVS 110, and a size of the predetermined image template is the same as a size of the pixel unit array. When the pixel unit array has a size of 20*30, the size of the predetermined image template is also 20*30. In other words, each pixel in the predetermined image template corresponds to one pixel unit in the pixel unit array. When a length of the predetermined image template is H, a width of the predetermined image plate is W and it is divided into m*n mage blocks, a length of each image block is H/m, and a width of each image block is W/n. In FIG. 4, $b_{ij}$ (i=1, 2, . . . m; j=1, 2, . . . , n) represents a serial number of an image block.

In some other embodiments of the present disclosure, when dividing the predetermined image template into the image blocks, adjacent image blocks may overlap with each other to some extent. The adjacent image blocks may include image blocks adjacent to each other in a horizontal direction and/or in a longitudinal direction. All, or a part of, image blocks overlap with each other, which will not be particularly defined herein. Usually, a size of an overlapping portion is smaller than the size of the image block. In this way, it is able to improve the granularity of an algorithm as well as the accuracy of a candidate object rectangle, but an additional computational burden occurs inevitably for the subsequent steps.

Within a predetermined time period T, the computing device 200 continuously or selectively receives and processes the event data flows from the DVS, and each piece of event data e(x,y,t) includes a coordinate position (x,y) of a triggered event and a timestamp t about a triggering time. In a possible embodiment of the present disclosure, when obtaining the event data flows, the computing device 200 detects the moving object for the event data flows within the predetermined time period. A timestamp of a first piece of event data received within the predetermined time period is $t_0$, and when a timestamp t in the event data received subsequently meets $t-t_0>T$, the computing device 200 stops receiving the event data.

Step S320: determining the quantity of pieces of event data in each image block within a predetermined time period. As mentioned hereinabove, the event data is triggered by movement of an object in a field of view relative to the dynamic vision sensor 110.

In a possible embodiment of the present disclosure, the quantity of pieces of event data in each image block is determined through $$H(b_{ij}) = \sum_{k=1}^{N} \delta\left(\left[\frac{x_k}{n}\right] + \left[\frac{y_k}{m}\right] + 2 - i - j\right),$$

where $b_{ij}$ represents an image block in an $i^{th}$ row and a $j^{th}$ column, i=1, 2, ..., m, j=1, 2, ..., n, $H(b_{ij})$ represents the quantity of pieces of event data in $b_{ij}$ within the predetermined time period, $(x_k, y_k)$ represents a coordinate position of a $k^{th}$ piece of event data, N represents the total quantity of pieces of event data received within the predetermined time period, $\delta(\cdot)$ represents a Dirac $\delta$ function, and [·] represents a rounding function.

Step S330: determining at least one image block including the moving object in accordance with the quantity of pieces of event data in each image block.

In the embodiments of the present disclosure, all image blocks in which the quantity of pieces of event data is greater than a first predetermined value are selected as the image blocks including the moving object, and these image blocks form a possible region where the object moves.

The first predetermined value is positively correlated with the size of the image block and the predetermined time period. In other words, the larger the size of the image block and the larger the predetermined time period T, the larger the first predetermined value. In a possible embodiment of the present disclosure, the first predetermined value is 100, the size of the image is 1280*800, the size of the image block is 32*32, and the predetermined time period is 30 ms. However, the present disclosure is not limited thereto.

Figure 4B:
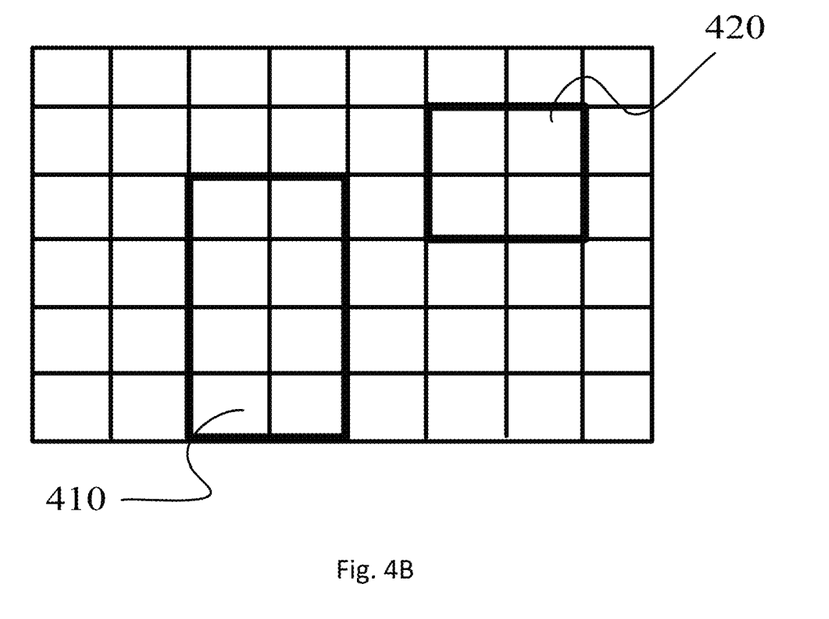

FIGS. 4A and 4B show the determination of a candidate object rectangle. As shown in FIG. 4A, the predetermined image template is divided into 48 image blocks in 6 rows and 8 columns, and image blocks surrounded by a solid line, i.e., image blocks a to j, are just the image blocks including the moving object.

In Step S340: generating the candidate object rectangle in accordance with the at least one image block. The candidate object rectangle is configured to include the moving object to the greatest extent, i.e., the candidate object rectangle indicates the detected moving object.

In a possible embodiment of the present disclosure, when there are two or more moving objects in the field of view, usually two or more candidate object rectangles are used to indicate different moving objects.

In the embodiments of the present disclosure, the image blocks determined in Step S330 are combined to obtain the candidate object rectangle. In a possible embodiment of the present disclosure, a plurality of consecutive image blocks having a common edge is determined in the at least one image block, and then at least one minimum bounding rectangle is generated as the corresponding candidate object rectangle in accordance with the plurality of consecutive image blocks.

In FIG. 4A, the image blocks a to g are consecutive image blocks having a common edge, and the image blocks h to j are consecutive image blocks having a common edge, i.e., two groups of consecutive image blocks are determined.

Next, a minimum bounding rectangle is generated for each of the two groups of consecutive image blocks, i.e., a candidate object rectangle 410 for the image blocks a to g and a candidate object rectangle 420 for the image blocks h to j, as shown in FIG. 4B.

In other words, the minimum bounding rectangle is generated for the consecutive image blocks having a common edge, rather than all the determined image blocks, so that different moving objects are not included in a same candidate object rectangle.

At this time, through the one or more candidate object rectangles, it is able to determine the one or more moving objects in the field of view within the predetermined time period.

According to the method 300 in the embodiments of the present disclosure, the predetermined image template is divided into the image blocks having a same block, and the quantity of pieces of event data in each image block is determined. In this way, it is able to rapidly determine all possible regions where the moving object is located without traversing the entire image, thereby to reduce the computational burden. In addition, the quantity of pieces of event data is determined on an image block basis rather than on a pixel-by-pixel basis, so it is able to remarkably reduce the computational burden and improve the positioning robustness.

In some other embodiments of the present disclosure, considering an interference caused by noise event data on a detection result, subsequent to generating the candidate object rectangle, the method further includes generating candidate object rectangles within two adjacent predetermined time periods, and processing a candidate object rectangle within a current predetermined time period so as to determine the final candidate object rectangle.

A procedure of processing the candidate object rectangle to determine the final candidate object rectangle will be described hereinafter.

In a possible embodiment of the present disclosure, overlap rates O of the candidate object rectangles within the current predetermined time period and a previous predetermined time period are calculated through $$O = \frac{\text{Area}(R_{curr} \cap R_{prev})}{\text{Area}(R_{curr})},$$

where $R_{curr}$ represents the candidate object rectangle within the current predetermined time period, $R_{prev}$ represents the candidate object rectangle within the previous determined time period, $\cap$ represents an operation for obtaining an overlapping portion between the two candidate object rectangles, and Area(·) represents a function for obtaining an area of the overlapping portion.

In a possible embodiment of the present disclosure, when there are two or more candidate object rectangles within the current predetermined time period and/or the previous predetermined time period, the overlap rate of each candidate object rectangle within the current predetermined time period and each candidate object rectangle within the previous predetermined time period is calculated. Of course, the overlap rate of the candidate object rectangle within the current predetermined time period and a candidate object rectangle within the previous predetermined time period, which is located within a region of interest or spaced apart from the candidate object rectangle within the current predetermined time period by a certain distance, may be calculated, which will not be particularly defined herein.

Next, the candidate object rectangle whose overlap rate is greater than a second predetermined value is selected as the final candidate object rectangle within the current predetermined time period. In a possible embodiment of the present disclosure, the second predetermined value is within a range of [0.5, 0.8], so as to ensure the continuity of the moving object in space and time.

When the candidate object rectangle within the current predetermined time period is determined in accordance with the overlap rate of the candidate object rectangle within the current predetermined time period and the candidate object rectangle within the previous predetermined time period, it is able to prevent the occurrence of any interference caused by the noise event data on the detection result.

Figure 5:
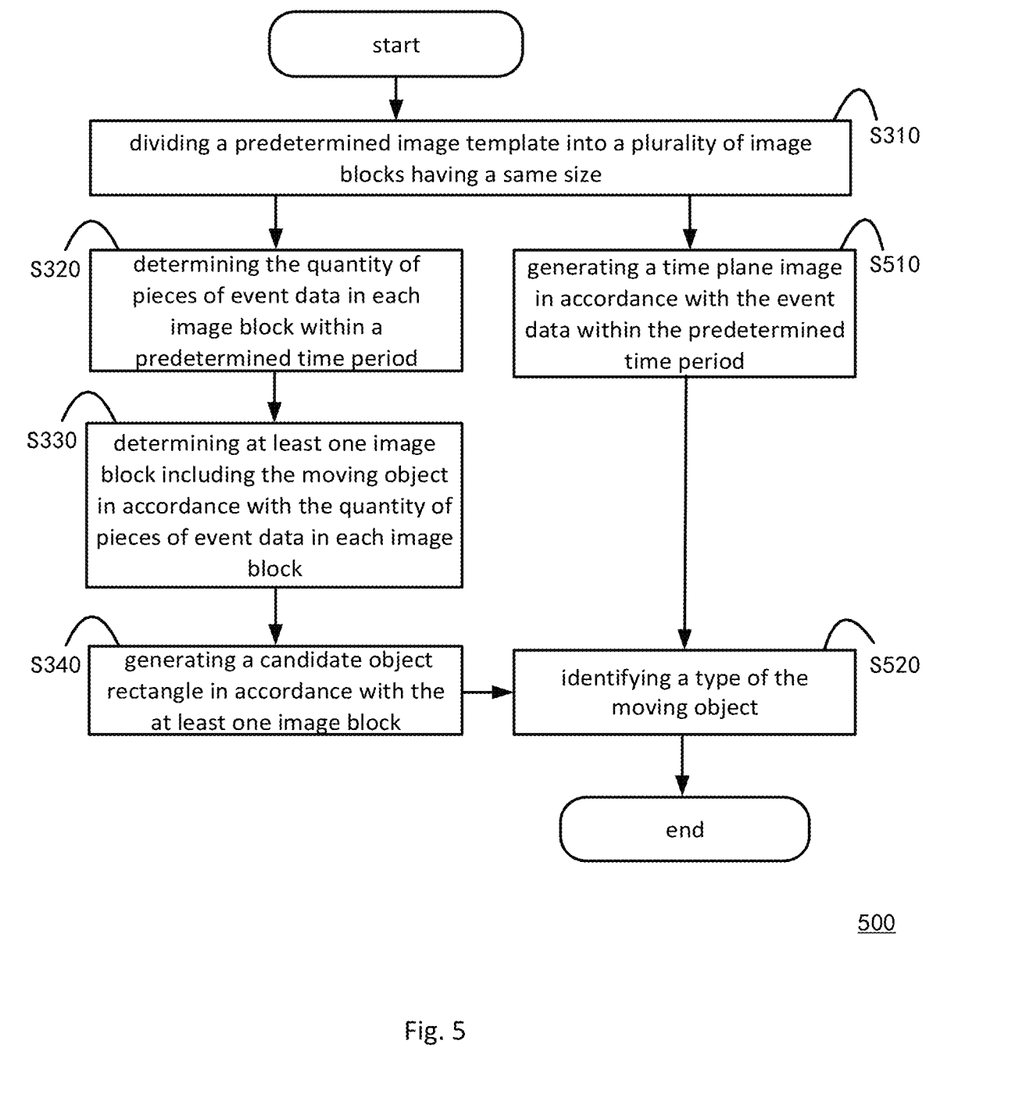
FIG. 5 is another flow chart of the method for detecting the moving object according to one embodiment of the present disclosure.

FIG. 5 shows a method 500 for detecting a moving object. The method 500 is performed on the basis of the method 300, so same contents in the method 500 will not be particularly defined herein.

In some embodiments of the present disclosure, when receiving the event data flow from the DVS 110, the method further includes mapping the event data within the predetermined time period to the predetermined image template to generate a time plane image corresponding to the predetermined time period.

As shown in FIG. 5, after generating the predetermined image template in Step S310, the computing device 200, on one hand, performs Step S510 to generate the time plane image in accordance with the event data within the predetermined time period, and on the other hand, determines the quantity of pieces of event data within the predetermined time period and generates the candidate object rectangle like those in Step S320 to Step S340.

In a possible embodiment of the present disclosure, a binarized time plane image is generated as follows. To be specific, for each pixel in the predetermined image template, whether there is a triggered event which has a same coordinate position as the pixel is determined, and then binarization is performed on a pixel value of the pixel in accordance with a determination result (i.e., whether the coordinate position of the triggered event is the same as the coordinate position of the pixel) so as to generate the time plane image. For example, when the coordinate position of the triggered event is the same as the coordinate position of the pixel, the pixel value of the pixel is set as 255, and when the coordinate position of the triggered event is different from the coordinate position of the pixel, the pixel value of the pixel is set as 0. The pixel value is set through $$I(x, y) = \begin{cases} 255, & \text{if } x = x_k, y = y_k; \\ 0, & \text{else} \end{cases},$$

where $(x_k, y_k)$ represents the coordinate position of the triggered event, $(x,y)$ represents the coordinate position of the pixel, and $I(x,y)$ represents the pixel value of the pixel at $(x,y)$.

It should be appreciated that, the above is for illustratively purposes only, and the generated time plane image is a grayscale image. However, the pixel values of the pixels will not be particularly defined herein, e.g., the pixel values may be 0 and 1, or 0 and 1023. In addition, the pixel value of each pixel may be set directly in accordance with a timestamp of the triggered event.

In another possible embodiment of the present disclosure, the time plane image is generated through accumulating the event data. To be specific, for each pixel in the predetermined image template, a relational value of a coordinate position of the pixel relative to the coordinate position of each triggered event is calculated, and then a pixel value of the pixel is updated in accordance with the relational value so as to generate the time plane image. The pixel value is calculated through $$I(x, y) = \sum_{k=1}^{N} [\delta(x + y - x_k - y_k) + C],$$

where $(x_k, y_k)$ represents the coordinate position of the triggered event, $(x,y)$ represents the coordinate position of the pixel, $I(x,y)$ represents the pixel value of the pixel at $(x,y)$, N represents the total quantity of pieces of event data received within the predetermined time period, $\delta(\cdot)$ represents a Dirac $\delta$ function, C is a constant, and $\delta(x+y-x_k-y_k)+C$ represents the relational value of the coordinate position of the pixel relative to the coordinate position of each triggered event.

A mode for generating the time plane image has illustratively been described hereinabove. It should be appreciated that, any method for generating the time plane image in accordance with the event data flow may be used to detect the moving object.

Subsequent to generating the candidate object rectangle corresponding to the predetermined time period, Step S520 is performed, i.e., identifying a type of the moving object indicated through the candidate object rectangle in the time plane image using an image classification algorithm.

In a possible embodiment of the present disclosure, the candidate object rectangle is mapped onto the time plane image, and then the type of the object in the candidate object rectangle is identified using an image classification algorithm, e.g., SVM or MobileNet. To be specific, a classification model is generated in accordance with different types of training images, and then the time plane image (or an image about a region corresponding to the candidate object rectangle) is inputted into the classification model to obtain the type of the object.

Figure 6:
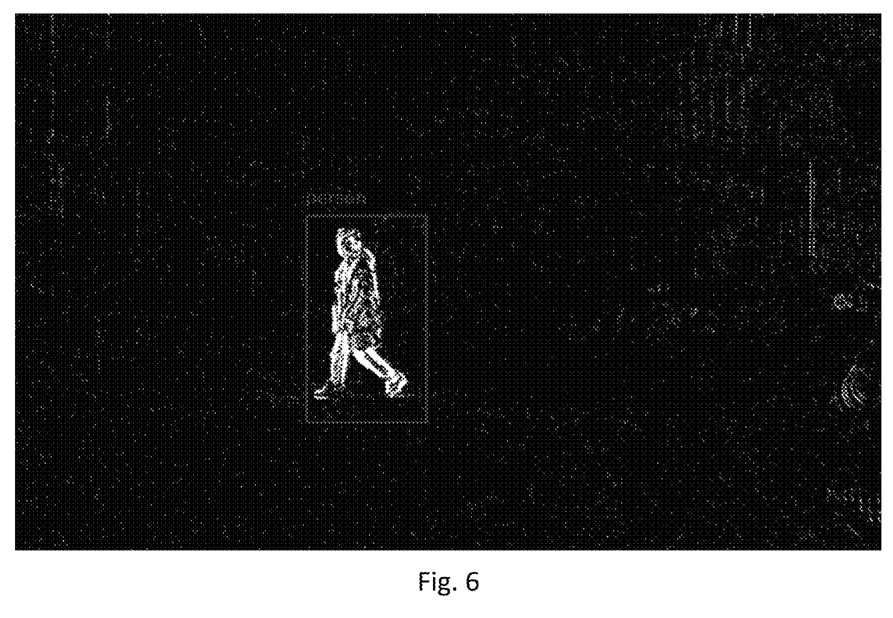
FIG. 6 is a schematic view showing a detection result of the moving object according to one embodiment of the present disclosure.

FIG. 6 shows a detection result of the moving object. As shown in FIG. 6, a detected moving object in the time plane image is bounded by a rectangle (i.e., the candidate object rectangle) and then identified as "person".

According to the method 500 in the embodiments of the present disclosure, the time plane image is generated in accordance with the event data so as to identify the type of the moving object, thereby to prevent the occurrence of missed detection and false detection in a conventional algorithm caused by the rapid movement of the object.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be further appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A method for detecting a moving object, comprising:
generating a predetermined image template in accordance with a pixel unit array in a dynamic vision sensor;
dividing the predetermined image template into a plurality of image blocks having a same size;
determining the quantity of pieces of event data in each image block within a predetermined time period, the event data being obtained by the dynamic vision sensor and triggered by movement of an object in a field of view relative to the dynamic vision sensor;
determining at least one image block comprising the moving object in accordance with the quantity of pieces of event data in each image block; and
generating a candidate object rectangle in accordance with the at least one image block, the candidate object rectangle indicating the detected moving object;
wherein the determining the quantity of pieces of event data in each image block within the predetermined time period comprises determining the quantity of pieces of event data in each image block through $$H(b_{ij}) = \sum_{k=1}^{N} \delta\left(\left[\frac{x_k}{n}\right] + \left[\frac{y_k}{m}\right] + 2 - i - j\right),$$

where $b_{ij}$ represents an image block in an $i^{th}$ row and a $j^{th}$ column, i=1, 2, ..., m, j=1, 2, ..., n, $H(b_{ij})$ represents the quantity of pieces of event data in $b_{ij}$ within the predetermined time period, $(x_k, y_k)$ represents a coordinate position of a $k^{th}$ piece of event data, N represents the total quantity of pieces of event data received within the predetermined time period, $\delta(\cdot)$ represents a Dirac $\delta$ function, and $[\cdot]$ represents a rounding function.

2. The method according to claim 1, further comprising mapping the event data within the predetermined time period to the predetermined image template to generate a time plane image corresponding to the predetermined time period, wherein the event data comprises a coordinate position and a timestamp of a triggered event.

3. The method according to claim 2, wherein subsequent to generating the candidate object rectangle in accordance with the at least one image block, the method further comprises identifying a type of the moving object indicated through the candidate object rectangle in the time plane image using an image classification algorithm.

4. The method according to claim 1, wherein the determining the at least one image block comprising the moving object in accordance with the quantity of pieces of event data in each image block comprises selecting an image block in which the quantity of pieces of event data is greater than a first predetermined value as the image block comprising the moving object.

5. The method according to claim 1, wherein the generating the candidate object rectangle in accordance with the at least one image block comprises:
determining a plurality of consecutive image blocks having a common edge in the at least one image block; and
generating at least one minimum bounding rectangle as the candidate object rectangle in accordance with the consecutive image blocks.

6. The method according to claim 1, wherein the generating the candidate object rectangle in accordance with the at least one image block further comprises:
calculating overlap rates of the candidate object rectangles detected within a current predetermined time period and a previous predetermined time period; and
selecting a candidate object rectangle whose overlap rate is greater than a second predetermined value as a candidate object rectangle within the current predetermined time period.

7. The method according to claim 2, wherein the mapping the event data within the predetermined time period to the predetermined image template to generate the time plane image corresponding to the predetermined time period comprises:

for each pixel in the predetermined image template, determining whether there is a triggered event which has a same coordinate position as the pixel; and performing binarization on a pixel value of the pixel in accordance with a determination result so as to generate the time plane image.

8. The method according to claim 2, wherein the mapping the event data within the predetermined time period to the predetermined image template to generate the time plane image corresponding to the predetermined time period comprises:

for each pixel in the predetermined image template, calculating a relational value of a coordinate position of the pixel relative to the coordinate position of each triggered event; and updating a pixel value of the pixel in accordance with the relational value so as to generate the time plane image.

9. The method according to claim 4, wherein the first predetermined value is positively correlated with the size of the image block and the predetermined time period.

10. A computing device, comprising one or more processor, a memory, and one or more programs stored in the memory, wherein the one or more programs is executed by the one or more processors so as to implement the method according to claim 1.

11. A non-transitory computer-readable storage medium storing therein one or more programs, wherein the one or more programs is executed by a computing device so as to implement the method according to claim 1.

12. A system for detecting a moving object, comprising the computing device according to claim 10, and a dynamic vision sensor coupled to the computing device and configured to trigger an event in accordance with movement of the object in a field of view relative to the dynamic vision sensor and output an event data flow to the computing device.

* * * * *